US012531465B2

(12) United States Patent
Tsuruma (10) Patent No.: US 12,531,465 B2
(45) Date of Patent: Jan. 20, 2026

(54) POWER CONVERSION DEVICE, METHOD OF CONTROLLING THREE-PHASE VOLTAGE INVERTER, AND CONTROL PROGRAM (71) Applicant: TMEIC Corporation, Tokyo (JP)

(72) Inventor: Yoshinori Tsuruma, Tokyo (JP)

(73) Assignee: TMEIC Corporation, Tokyo (JP)

( * ) Notice: Subject to any disclaimer, the term of this patent is extended or adjusted under 35 U.S.C. 154(b) by 17 days.

(21) Appl. No.: 18/291,385

(22) PCT Filed: Oct. 14, 2021

(86) PCT No.: PCT/JP2021/038053
§ 371 (c)(1),
(2) Date: Jan. 23, 2024

(87) PCT Pub. No.: WO2023/062779
PCT Pub. Date: Apr. 20, 2023

(65) Prior Publication Data
US 2025/0105719 A1    Mar. 27, 2025

(51) Int. Cl.
*H02M 1/00*     (2007.01)
*H02M 7/5387*   (2007.01)
(Continued)

(52) U.S. Cl.
CPC ..... *H02M 1/0012* (2021.05); *H02M 7/53873* (2013.01); *H02M 7/5395* (2013.01); *H02M 7/797* (2013.01)

(58) Field of Classification Search
CPC ........... H02M 1/0012; H02M 7/53873; H02M 7/5395; H02M 7/797
See application file for complete search history.

(56) References Cited

U.S. PATENT DOCUMENTS

| 6,995,992 B2* | 2/2006 | Wei | H02M 5/4585 |
| | | | 363/39 |
| 2012/0224403 A1* | 9/2012 | Wu | H02M 7/5395 |
| | | | 363/132 |

(Continued)

FOREIGN PATENT DOCUMENTS

| EP | 2713501 A2 | 4/2014 |
| EP | 3637608 A1 | 4/2020 |

(Continued)

OTHER PUBLICATIONS

International Search Report and Written Opinion issued Nov. 22, 2021, in PCT/JP2021/038053 filed on Oct. 14, 2021, 10 pages (with English Translation).

(Continued)

*Primary Examiner* — Jue Zhang
(74) *Attorney, Agent, or Firm* — Oblon, McClelland, Maier & Neustadt, L.L.P.

(57) ABSTRACT

A power conversion device having an addition value calculation circuit which obtains addition values of maximum phases and minimum phases of first output voltage command signals, an effective value calculation circuit which obtains an effective value of an output voltage command based on the first output voltage command signals, coefficient determination means for determining a coefficient which minimizes power loss of the three-phase voltage inverter based on the effective value, a value of the DC voltage, and an output power factor command, a control amount calculation circuit which obtains control amounts by multiplying the addition values, an output voltage command signal control circuit which obtains second output voltage command signals as signals resulting from subtraction of the control amounts respectively from the three phases of the first output voltage command signals, and a PWM control (Continued)

circuit which generates gate signals based on the second output voltage command signals.

14 Claims, 8 Drawing Sheets

(51) Int. Cl.
*H02M 7/5395* (2006.01)
*H02M 7/797* (2006.01)

(56) References Cited

U.S. PATENT DOCUMENTS

2018/0062542 A1* 3/2018 Sakakibara .......... H02M 5/4585
2020/0373854 A1* 11/2020 Tanaka .................... H02M 1/12

FOREIGN PATENT DOCUMENTS

| EP | 3849075 A1 | 7/2021 |
| JP | 6733816 B2 | 8/2020 |

OTHER PUBLICATIONS

Extended European Search Report dated Jul. 1, 2025, issued in counterpart EP Application No. 21960636.5. (10 pages).

* cited by examiner

POWER CONVERSION DEVICE, METHOD OF CONTROLLING THREE-PHASE VOLTAGE INVERTER, AND CONTROL PROGRAM

FIELD

The present invention relates to a power conversion device, a method of controlling a three-phase voltage inverter, and a control program.

BACKGROUND

In related art, as a manner of controlling an inverter, PWM (pulse width modulation) control has been known. In a three-phase voltage inverter, a voltage command signal of a sinusoidal wave is generated in each phase of U phase, V phase, and W phase of three phases, and each of those three phases of the voltage command signals is compared with a carrier signal as a triangle wave for achieving the PWM control of the three phases.

Superimposition of the third harmonic wave, which is at the frequency three times a fundamental wave, on each of the three phases of the voltage command signal causes a waveform of the voltage command signal to change, so that a condition of a gate pulse, that is, an ON-OFF ratio of an inverter output voltage is changed. As a result, a time ratio of a current, which flows through a path having a switching element and a path having a diode in the inverter, is also changed. Further, because a difference in power loss may occur depending on paths of a current, a difference may eventually occur to conversion efficiency of the inverter.

Thus, there has been suggested a manner of controlling an inverter in which in order to improve conversion efficiency of a three-phase voltage inverter, an amplitude of the third harmonic wave which minimizes power loss is determined and the determined amplitude of the third harmonic wave is superimposed on three phases of voltage command signals (for example, see PTL 1).

CITATION LIST

Patent Literature

[PTL 1] JP 6733816 B

SUMMARY

Technical Problem

However, in a manner in related art in which an amplitude of the third harmonic wave at the frequency three times a fundamental wave is superimposed on three phases of voltage command signals, computation possibly becomes complicated.

Meanwhile, in related art, as for a three-phase voltage inverter, a procedure has been known in which in order to obtain a wide output voltage range, a value resulting from multiplication, by a coefficient, of the addition value of the maximum phase and the minimum phase of a sinusoidal output voltage command signal is subtracted from the output voltage command signal. In this case, the fact has been known that the amplitude is most reduced in a case where the above coefficient is set to 0.5.

Figure 8:
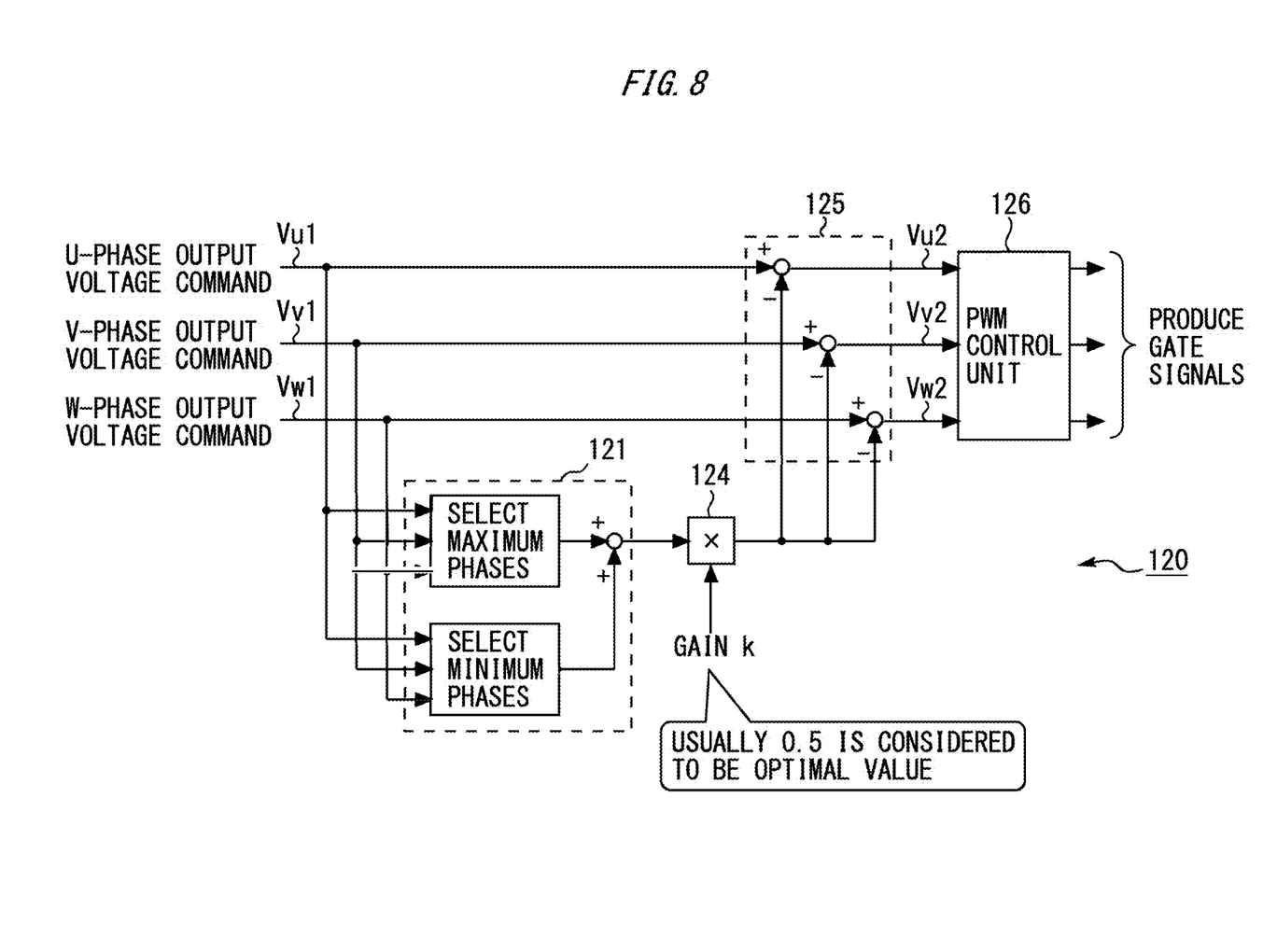
FIG. 8 is a diagram for describing a control procedure of a three-phase voltage inverter in a control device of a power conversion device in related art.

FIG. 8 is a diagram for describing a control procedure of a three-phase voltage inverter in a control device 120 of a power conversion device 100 in related art. In FIG. 8, the control device 120 has an addition value calculation unit 121, a control amount calculation unit 124, an output voltage command signal control unit 125, and a PWM control unit 126.

The addition value calculation unit 121 selects maximum phases and minimum phases of three phases of sinusoidal output voltage command signals Vu1, Vv1, and Vw1 and calculates respective addition values of the selected maximum phases and minimum phases.

The control amount calculation unit 124 multiplies, by a coefficient k (gain k), the addition values obtained by the addition value calculation unit 121 and obtains control amounts for the output voltage command signals Vu1, Vv1, and Vw1. As described above, in a case where the coefficient k (gain k) is 0.5, the amplitude is most reduced.

The output voltage command signal control unit 125 obtains output voltage command signals Vu2, Vv2, and Vw2 which result from subtraction of the control amounts obtained by the control amount calculation unit 124 from the three phases of the output voltage command signals Vu1, Vv1, and Vw1.

The PWM control unit 126 compares the output voltage command signals Vu2, Vv2, and Vw2 obtained by the output voltage command signal control unit 125 with a carrier signal as a triangle wave, performs PWM control, and produces gate signals.

As described above, a coefficient k (gain k) of 0.5 is considered to be optimal in order to obtain a more output voltage amplitude. Here, a reason why 0.5 is optimal will be described. For example, in third harmonic superimposition which is actually practiced in solar power generation (PV: photovoltaics), a storage battery (ESS: energy storage system), and so forth, not a sinusoidal wave at a three times higher frequency but a signal which is a modulated wave itself being processed is used. Thus, the above third harmonic superimposition which is actually practiced is not "third harmonic superimposition", strictly speaking.

Specifically, the above third harmonic superimposition is realized by subtracting k×(maximum phase +minimum phase) (k is a coefficient) from each phase of three phases of sinusoidal waves. In this case, the optimal value of the coefficient k can be obtained by solving a problem of "obtaining the value of k which minimizes the amplitude of $f(\theta)=\sin\theta-k\{\sin\theta+\sin(\theta+2\pi/3)\}$ in $\pi/6 \leq \theta \leq \pi/2$".

In the formula in the above problem, k denotes the coefficient, and $\{\sin\theta+\sin(\theta+2\pi/3)\}$ denotes (maximum phase+minimum phase) in $\pi/6 \leq \theta \leq \pi/2$. In the above formula, when k which minimizes the amplitude is obtained, a numerical value of 0.5 comes out. Thus, the optimal value of the coefficient k becomes 0.5. Note that the above problem is an extreme value problem in calculus. That is, the above problem is an extremum problem which has two stages and in which when a function of $f(\theta)$ is given, this function is differentiated, θ is obtained at which the derivative value becomes zero, and k is then obtained which minimizes the obtained value.

Figures 9, 9A:
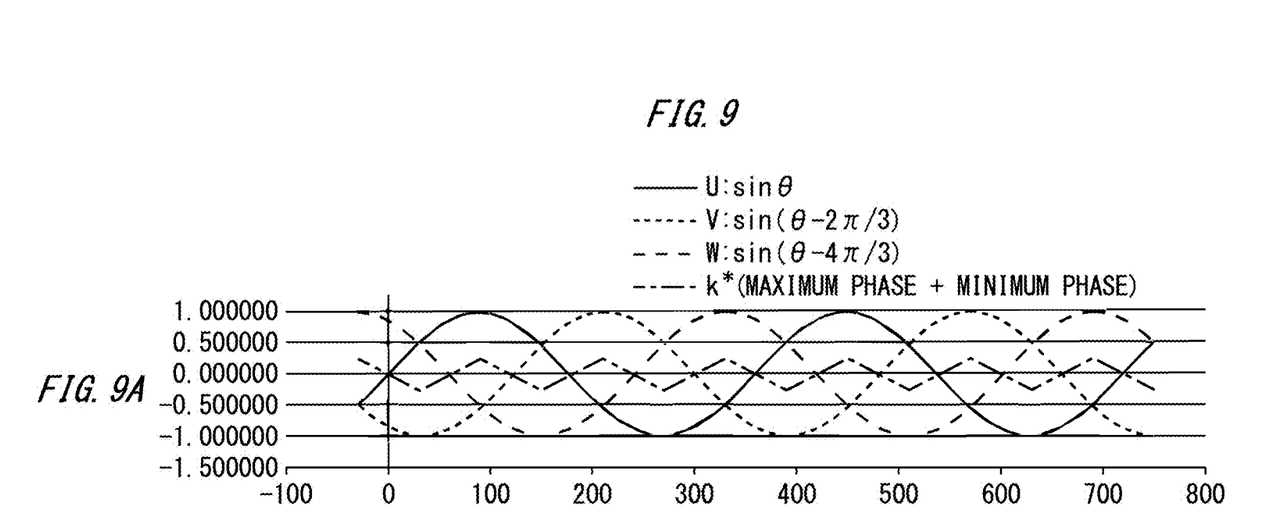
FIG. 9 is a diagram for describing a reason why 0.5 is optimal as a gain k in the control procedure illustrated in FIG. 8.
Figure 9B:
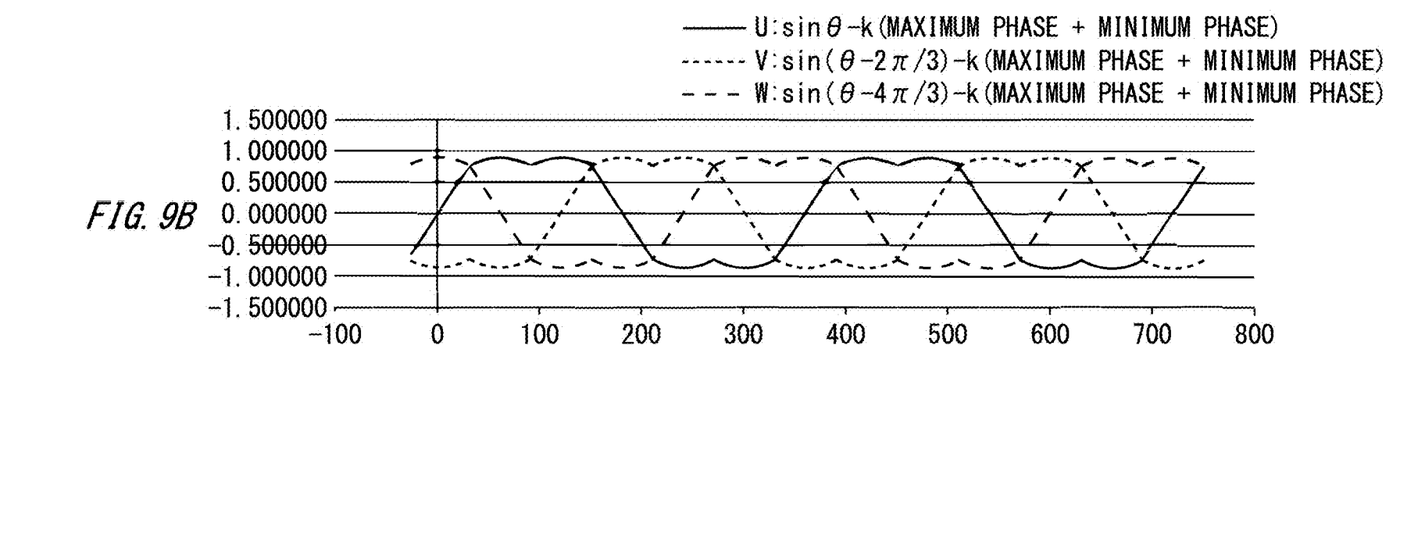

FIG. 9 is a diagram for describing a reason why 0.5 is optimal as the gain k in the control procedure illustrated in FIG. 8. FIG. 9A is a diagram illustrating states of sinusoidal waves of U phase, V phase, and W phase and k×(maximum phase+minimum phase) in a case where k is 0.5. FIG. 9B is a diagram illustrating states of changes in the function of $f(\theta)$ in a case where k is 0.5.

In FIG. 9A, a sinusoidal wave by a solid line represents the U phase as $\sin\theta$, a sinusoidal wave by a broken line with short dashes represents the V phase as $\sin(\theta-2\pi/3)$, and a sinusoidal wave by a rough broken line represents the W phase as $\sin(\theta-4\pi/3)$. Further, a one-dot chain line represents $k\times$(maximum phase+minimum phase) in a case where k is 0.5.

Further, in FIG. 9B, a solid line represents the U phase as $\sin\theta-k\times$(maximum phase+minimum phase), a broken line with short dashes represents the V phase as $\sin(\theta-2\pi/3)-k\times$(maximum phase+minimum phase), and a rough broken line represents the W phase as $\sin(\theta-4\pi/3)-k\times$(maximum phase+minimum phase).

That is, FIG. 9B illustrates the results of subtraction of the control amounts from the sinusoidal output voltage command signals. FIG. 9B illustrates shapes of sinusoidal waves in which peaks are slightly recessed. The example illustrated in FIG. 9B is an example of a case where k=0.5. Here, for example, in a case where k is decreased like 0.4, 0.3, 0.2, . . . , the recesses in the peaks of the sinusoidal waves are decreased. On the other hand, for example, in a case where k is increased like 0.6, 0.7, 0.8, . . . , conversely, the recesses in the peaks of the sinusoidal waves are excessively increased. Thus, as illustrated in FIG. 9B, the optimally recessed situation is obtained when k=0.5.

When superimposition is performed for a sinusoidal wave with a unit amplitude with the gain k being 0.5, the local maximum value becomes $(\sqrt{3})/2$. Accordingly, in an ideal state (where even a modulation degree of one can be used without taking into consideration dead time or the like), because an output of a fundamental wave amplitude of $2/(\sqrt{3})=1.1547$ is possible, effects can be obtained which are equivalent to third harmonic superimposition of "a type in which the third harmonic wave is actually added". Thus, as a procedure of simply realizing a method which can obtain effects equivalent to the above-described method of superimposing a three times higher frequency (as known as third harmonic superimposition), a procedure is employed in which the gain k is set to 0.5.

However, the fact that 0.5 is optimal as the gain k only means that 0.5 is optimal for the purpose of earning the output voltage amplitude as much as possible. However, for the purpose of maximizing efficiency of a three-phase voltage inverter, the gain k of 0.5 is not necessarily optimal.

Accordingly, an object of the present disclosure is to improve conversion efficiency of a three-phase voltage inverter by a simpler procedure than a procedure in related art in which an amplitude of the third harmonic wave is superimposed. Solution to Problem A power conversion device according to one aspect includes: a three-phase voltage inverter which converts a DC voltage from a DC power source to three-phase AC voltages and outputs the three-phase AC voltages to a power system; an addition value calculation unit which obtains addition values of maximum phases and minimum phases of first output voltage command signals as three phases of sinusoidal output voltage command signals in the three-phase AC voltages; an effective value calculation unit which obtains an effective value of an output voltage command based on the three phases of the first output voltage command signals; coefficient determination means for determining a coefficient which minimizes power loss of the three-phase voltage inverter based on the effective value obtained by the effective value calculation unit, a value of the DC voltage, and an output power factor command corresponding to a request for an output to the power system; a control amount calculation unit which obtains control amounts by multiplying the addition values obtained by the addition value calculation unit by the coefficient determined by the coefficient determination means; an output voltage command signal control unit which obtains second output voltage command signals as signals resulting from subtraction of the control amounts obtained by the control amount calculation unit respectively from the three phases of the first output voltage command signals; and a PWM control unit which generates gate signals based on the second output voltage command signals obtained by the output voltage command signal control unit and a triangle-wave-shaped carrier signal.

Note that in the power conversion device according to one aspect, the effective value calculation unit may obtain the effective value by converting the three phases of the first output voltage command signals to a d-axis voltage command signal and a q-axis voltage command signal and by taking a square root of a sum of a square of the d-axis voltage command signal resulting from conversion and a square of the q-axis voltage command signal resulting from the conversion.

Further, in the power conversion device according to one aspect, the coefficient determination means may determine the coefficient corresponding to a combination of the effective value, the value of the DC voltage, and the output power factor command based on a coefficient table which defines a relationship among the effective value, the value of the DC voltage, the output power factor command, and the coefficient which minimizes the power loss of the three-phase voltage inverter.

Further, in the power conversion device according to one aspect, the coefficient determination means may determine the coefficient which minimizes the power loss of the three-phase voltage inverter based on a function which has, as parameters, the effective value, the value of the DC voltage, and the output power factor command.

A method of controlling a three-phase voltage inverter according to one aspect is a method of controlling a three-phase voltage inverter in a power conversion device which includes the three-phase voltage inverter converting a DC voltage from a DC power source to three-phase AC voltages and outputting the three-phase AC voltages to a power system, the method including: an addition value calculation step of obtaining addition values of maximum phases and minimum phases of first output voltage command signals as three phases of sinusoidal output voltage command signals in the three-phase AC voltages; an effective value calculation step of obtaining an effective value of an output voltage command based on the three phases of the first output voltage command signals; a coefficient determination step of determining a coefficient which minimizes power loss of the three-phase voltage inverter based on the effective value obtained by the effective value calculation step, a value of the DC voltage, and an output power factor command corresponding to a request for an output to the power system; a control amount calculation step of obtaining control amounts by multiplying the addition values obtained by the addition value calculation step by the coefficient determined by the coefficient determination step; an output voltage command signal control step of obtaining second output voltage command signals as signals resulting from subtraction of the control amounts obtained by the control amount calculation step respectively from the three phases of the first output voltage command signals; and a PWM control step of generating gate signals based on the second output voltage command signals obtained by the output voltage command signal control step and a triangle-wave-shaped carrier signal.

A control program of a three-phase voltage inverter according to one aspect causes a computer to execute processes of the method of controlling a three-phase voltage inverter.

Advantageous Effects of Invention

In the present disclosure, conversion efficiency of a three-phase voltage inverter can be improved by a simpler procedure than a procedure in related art in which an amplitude of the third harmonic wave is superimposed.

DESCRIPTION OF EMBODIMENTS

A power conversion device, a method of controlling a three-phase voltage inverter, and a control program of the present disclosure will hereinafter be described by using drawings.

Configuration of First Embodiment

Figure 1:
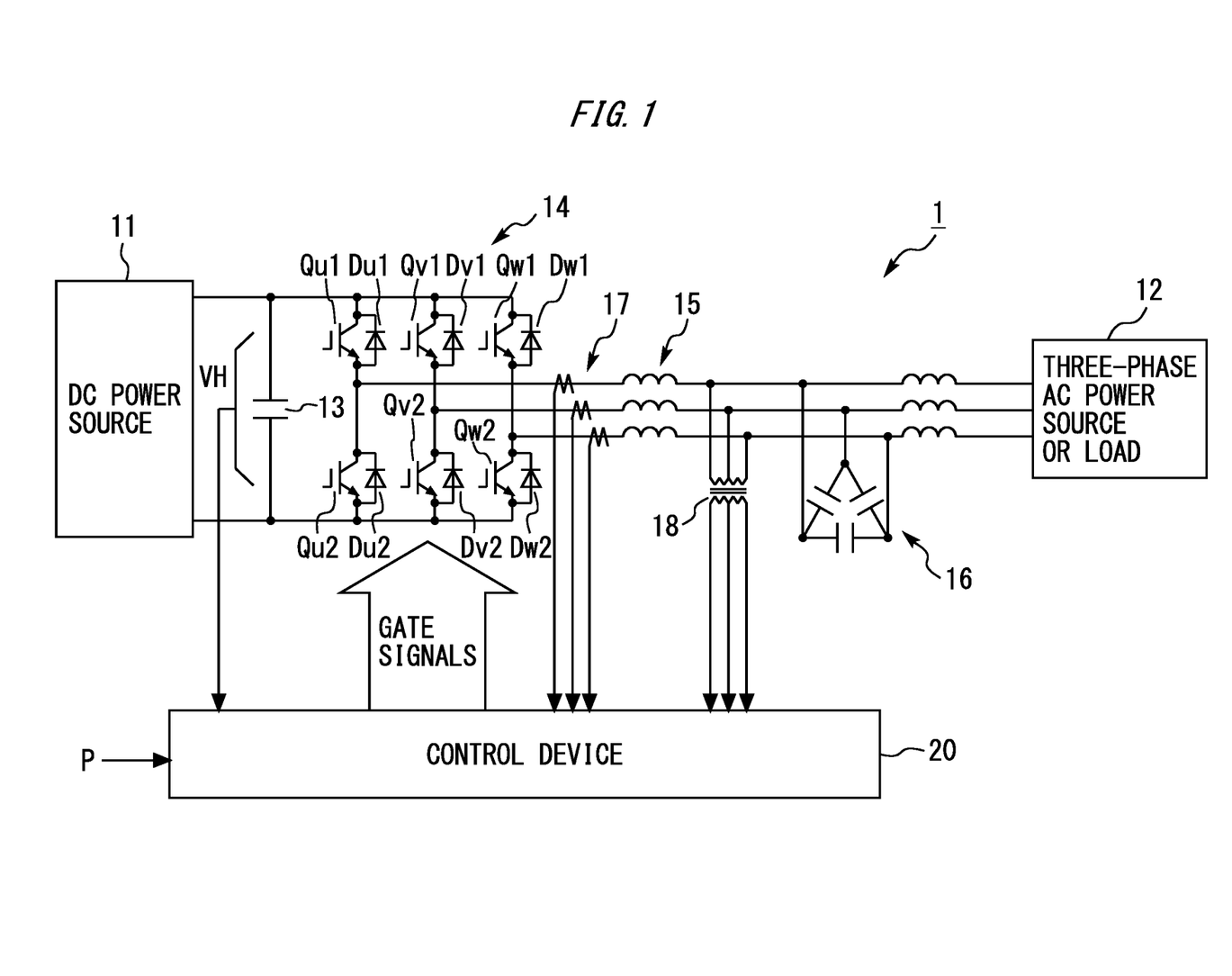
FIG. 1 is a diagram illustrating a configuration example of a power conversion device according to a first embodiment.

FIG. 1 is a diagram illustrating a configuration example of a power conversion device 1 according to a first embodiment.

As illustrated in FIG. 1, the power conversion device (PCS: power conditioning subsystem) 1 is connected with a DC power source 11 and a power system 12. The power conversion device 1 converts DC power supplied from the DC power source 11 to AC power via a three-phase voltage inverter 14 described later and outputs that to the power system 12.

The DC power source 11 is connected with a DC end of the power conversion device 1 and supplies DC power to the power conversion device 1 via the DC end of the power conversion device 1. The DC power source 11 is a solar power generation device (PV) including a solar panel, a storage battery (ESS), or the like, for example. Note that the DC power source 11 may be a DC power source system or the like formed with a wind power generator, an AC/DC converter, and so forth, for example.

The power system 12 is connected with an AC end of the power conversion device 1 and is connected with a power plant, a factory, or the like (a three-phase AC power source, a load, or the like) via power transmission lines. The power conversion device 1 has to conform to a presently requested power factor in power transmission to the power system 12.

The power conversion device 1 has a smoothing capacitor 13, the three-phase voltage inverter 14, a reactor 15, a capacitor 16, an ammeter 17, and a voltmeter 18.

The smoothing capacitor 13 is a capacitor which is connected between a positive electrode side and a negative electrode side of the DC power source 11 and is for smoothing a fluctuation in a voltage VH across terminals.

The three-phase voltage inverter 14 converts a DC voltage from the DC power source 11 to three-phase AC voltages and outputs those to the power system 12. For example, the three-phase voltage inverter 14 has a circuit in which three legs (U-phase leg, V-phase leg, and W-phase leg) are connected in parallel. Each of the legs is formed by connecting, in series, two arms in each of which a switching element and a freewheeling diode are connected in reversely parallel. Each of the legs is in parallel connected between the positive electrode side and the negative electrode side of the DC power source 11.

Specifically, the U-phase leg has a switching element Qu1 and a switching element Qu2. The switching element Qu1 and the switching element Qu2 are connected in series in order from the positive electrode side of the DC power source 11. An intermediate point between the switching element Qu1 and the switching element Qu2 is electrically connected with a U-phase terminal of the power system 12. Further, the switching element Qu1 and a freewheeling diode Du1 are connected in reversely parallel. The switching element Qu2 and a freewheeling diode Du2 are connected in reversely parallel.

The V-phase leg has a switching element Qv1 and a switching element Qv2. The switching element Qv1 and the switching element Qv2 are connected in series in order from the positive electrode side of the DC power source 11. An intermediate point between the switching element Qv1 and the switching element Qv2 is electrically connected with a V-phase terminal of the power system 12. Further, the switching element Qv1 and a freewheeling diode Dv1 are connected in reversely parallel. The switching element Qv2 and a freewheeling diode Dv2 are connected in reversely parallel.

The W-phase leg has a switching element Qw1 and a switching element Qw2. The switching element Qw1 and the switching element Qw2 are connected in series in order from the positive electrode side of the DC power source 11. An intermediate point between the switching element Qw1 and the switching element Qw2 is electrically connected with a W-phase terminal of the power system 12. Further, the switching element Qw1 and a freewheeling diode Dw1 are connected in reversely parallel. The switching element Qw2 and a freewheeling diode Dw2 are connected in reversely parallel.

Note that in this embodiment, as each of the switching elements Qu1 to Qw2, an IGBT (insulated gate bipolar transistor) is employed. However, a switching element is not limited to this, but a MOSFET (metal-oxide-semiconductor field-effect transistor) or the like may be used.

The reactor 15 is a smoothing element provided between the intermediate point of each of the legs of the three-phase voltage inverter 14 and the power system 12. The capacitor 16 constitutes, together with the reactor 15, a filter circuit which reduces a ripple.

The ammeter 17 detects an output current of the three-phase voltage inverter 14. A value of the detected output current is obtained by the control device 20.

The voltmeter 18 detects an output voltage (line voltage) of the three-phase voltage inverter 14. A value of the detected output voltage is obtained by the control device 20.

The control device 20 has a processor, which is not illustrated, such as a CPU (central processing unit) or a GPU (graphics processing unit) which acts by execution of a program, for example. The control device 20 causes the processor not illustrated to act by executing a predetermined program stored in a storage unit 30 (see FIG. 2) described later and thereby integrally controls an action of the power conversion device 1, for example.

For example, the control device 20 is provided to an internal portion or an external portion of the power conversion device 1 and is electrically connected with elements, including the three-phase voltage inverter 14, of the power conversion device 1 in a wired or wireless manner although wiring or the like is not illustrated in FIG. 1. Note that the control device 20 may be realized as a function of an inverter control circuit which is not illustrated.

The control device 20 obtains the voltage VH across terminals which is detected by a voltmeter not illustrated, the output current detected by the ammeter 17, the line voltage detected by the voltmeter 18, and a power command P. Note that the power command P is a command corresponding to a request for an output to the power system 12 and is obtained from an external portion (for example, a host device or the like) of the power conversion device 1. The control device 20 generates a gate signal for driving each of the switching elements Qu1 to Qw2. An action of the three-phase voltage inverter 14 is controlled by the generated gate signals.

Figure 2:
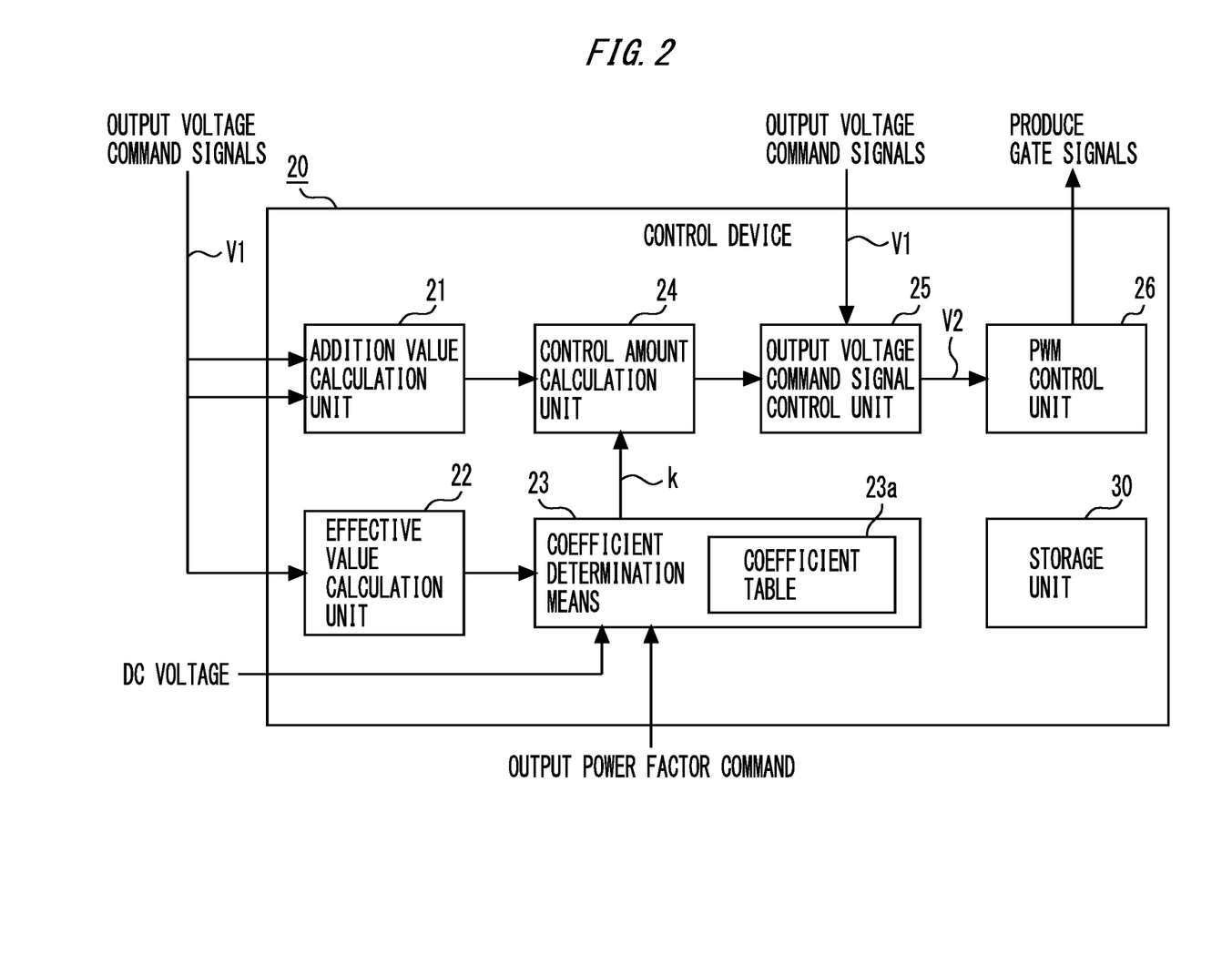
FIG. 2 is a diagram illustrating a configuration example of a control device in the power conversion device illustrated in FIG. 1.

FIG. 2 is a diagram illustrating a configuration example of the control device 20 in the power conversion device 1 illustrated in FIG. 1.

The control device 20 functions as an addition value calculation unit 21, an effective value calculation unit 22, coefficient determination means 23, a control amount calculation unit 24, an output voltage command signal control unit 25, and a PWM control unit 26. Further, the control device 20 has the storage unit 30.

The addition value calculation unit 21 obtains three phases of sinusoidal output voltage command signals V1 in the three-phase AC voltages, selects maximum phases and minimum phases of the obtained three phases of the output voltage command signals V1, and calculates addition values of the selected maximum phases and minimum phases. In FIG. 2, the output voltage command signals V1 are indicated by one line but are actually divided into three phases of a U-phase output voltage command signal Vu1, a V-phase output voltage command signal Vv1, and a W-phase output voltage command signal Vw1. The addition value calculation unit 21 outputs the obtained addition values to the control amount calculation unit 24. Note that the three phases of the output voltage command signals V1 (the U-phase output voltage command signal Vu1, the V-phase output voltage command signal Vv1, and the W-phase output voltage command signal Vw1) are one example of "first output voltage command signal".

Note that the effective value calculation unit 22 obtains an effective value of an output voltage command based on the three phases of the sinusoidal output voltage command signals V1 (the U-phase output voltage command signal Vu1, the V-phase output voltage command signal Vv1, and the W-phase output voltage command signal Vw1) in the three-phase AC voltages. The effective value calculation unit 22 converts the three phases of the output voltage command signals V1 (the U-phase output voltage command signal Vu1, the V-phase output voltage command signal Vv1, and the W-phase output voltage command signal Vw1) to a d-axis voltage command signal Vd and a q-axis voltage command signal Vq. The effective value calculation unit 22 takes the square root of the sum of the square of the d-axis voltage command signal Vd and the square of the q-axis voltage command signal Vq, the d-axis voltage command signal Vd and the q-axis voltage command signal Vq resulting from the conversion, and thereby obtains the effective value. The effective value calculation unit 22 outputs the obtained effective value of the output voltage command to the coefficient determination means 23.

The coefficient determination means 23 determines a coefficient k which minimizes power loss of the three-phase voltage inverter 14 based on the effective value obtained by the effective value calculation unit 22, the value of the DC voltage, and an output power factor command corresponding to the request for the output to the power system. The determined coefficient k will also be referred to as "gain k". Note that the output power factor command is obtained from an external portion such as a host device not illustrated.

The coefficient determination means 23 has a coefficient table 23a which defines the relationship among the above effective value, the value of the DC voltage, the output power factor command, and the coefficient which minimizes the power loss of the three-phase voltage inverter. Note that contents of the coefficient table 23a are in advance obtained based on analyses and actual operation data such that the efficiency becomes highest in each condition. Note that the coefficient table 23a may be retained by the storage unit 30.

Based on the coefficient table 23a, the coefficient determination means 23 determines the coefficient k which minimizes the power loss of the three-phase voltage inverter 14 and which corresponds to a combination of the above effective value, the value of the DC voltage, and the output power factor command. The coefficient determination means 23 outputs the determined coefficient k to the control amount calculation unit 24.

The control amount calculation unit 24 obtains the addition values obtained by the addition value calculation unit 21 and the coefficient k determined by the coefficient determination means 23, multiplies the obtained addition values by the coefficient k, and thereby obtains control amounts for the output voltage command signals V1. The control amount calculation unit 24 outputs the obtained control amounts to the output voltage command signal control unit 25.

The output voltage command signal control unit 25 respectively subtracts the control amounts obtained by the control amount calculation unit 24 from the three phases of the output voltage command signals V1 and thereby obtains three phases of output voltage command signals V2 as signals resulting from the subtraction. Note that in FIG. 2, the output voltage command signals V2 are indicated by one line but are actually divided into three phases of a U-phase output voltage command signal Vu2, a V-phase output voltage command signal Vv2, and a W-phase output voltage command signal Vw2. The output voltage command signal control unit 25 outputs the obtained output voltage command signals V2 (the U-phase output voltage command signal Vu2, the V-phase output voltage command signal Vv2, and the W-phase output voltage command signal Vw2) to the PWM control unit 26. Note that the three phases of the output voltage command signals V2 (the U-phase output voltage command signal Vu2, the V-phase output voltage command signal Vv2, and the W-phase output voltage command signal Vw2) are one example of "second output voltage command signal".

The PWM control unit 26 generates the gate signals based on the three phases of the output voltage command signals V2 obtained by the output voltage command signal control unit 25 and a triangle-wave-shaped carrier signal. The PWM control unit 26 outputs the generated gate signals to the three-phase voltage inverter 14.

The storage unit 30 is a volatile or non-volatile storage medium such as an HDD (hard disk drive), an SDD (solid state drive), or a semiconductor memory, for example, and stores programs necessary for actions of units of the control device 20, for example. Further, the storage unit 30 stores values obtained and results calculated by the units of the control device 20, coefficient tables and functions which are necessary for calculation, and so forth. The storage unit 30 is connected with the units of the control device 20 by a bus or the like not illustrated, for example. Note that the storage unit 30 may be provided to an external portion of the control device 20, may be connected with the control device 20 in a wired or wireless manner, and may be an external storage medium or the like such as a memory card or a DVD (digital versatile disc) or an online storage or the like.

Control Procedure of First Embodiment

Figure 3:
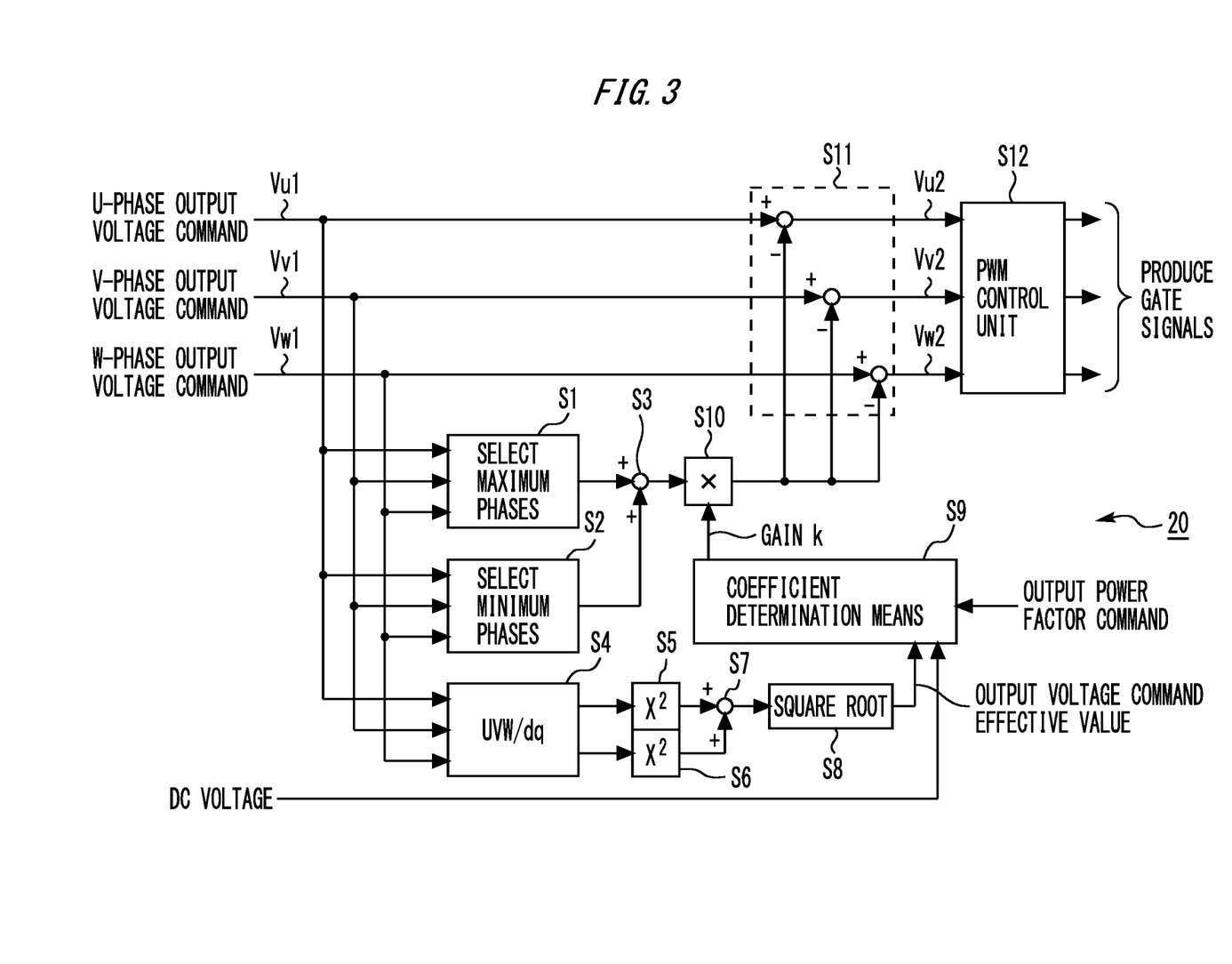
FIG. 3 is a diagram for describing a control procedure of a three-phase voltage inverter in the control device illustrated in FIG. 2.

FIG. 3 is a diagram for describing a control procedure in the control device 20 illustrated in FIG. 2. The control in FIG. 3 is started when an operation of the power conversion device 1 is started, for example. In the following, the control illustrated in FIG. 3 will be described (see also FIG. 2, appropriately).

In step S1, the addition value calculation unit 21 of the control device 20 selects the maximum phases of the three phases of the output voltage command signals V1 (the U-phase output voltage command signal Vu1, the V-phase output voltage command signal Vv1, and the W-phase output voltage command signal Vw1).

In step S2, the addition value calculation unit 21 of the control device 20 selects the minimum phases of the three phases of the output voltage command signals V1 (the U-phase output voltage command signal Vu1, the V-phase output voltage command signal Vv1, and the W-phase output voltage command signal Vw1).

In step S3, the addition value calculation unit 21 of the control device 20 adds the maximum phases selected in step S1 to the minimum phases selected in step S2 and thereby obtains the addition values.

In step S4, the effective value calculation unit 22 of the control device 20 performs conversion from three phases to two phases (dq conversion) for the three phases of the output voltage command signals V1 (the U-phase output voltage command signal Vu1, the V-phase output voltage command signal Vv1, and the W-phase output voltage command signal Vw1). Accordingly, the effective value calculation unit 22 converts the three phases of the output voltage command signals V1 (the U-phase output voltage command signal Vu1, the V-phase output voltage command signal Vv1, and the W-phase output voltage command signal Vw1) to the d-axis voltage command signal Vd and the q-axis voltage command signal Vq.

In step S5, the effective value calculation unit 22 of the control device 20 obtains the square value of the value of the d-axis voltage command signal Vd.

In step S6, the effective value calculation unit 22 of the control device 20 obtains the square value of the value of the q-axis voltage command signal Vq.

In step S7, the effective value calculation unit 22 of the control device 20 obtains the value resulting from addition of the value obtained in step S5 and the value obtained in step S6.

In step S8, the effective value calculation unit 22 of the control device 20 obtains the value of the square root of the value obtained in step S7. The value obtained in step S8 becomes the effective value (amplitude) of the output voltage command.

In step S9, the coefficient determination means 23 of the control device 20 determines the coefficient k (gain k) which minimizes the power loss of the three-phase voltage inverter 14 based on the effective value obtained in step S8, the value of the DC voltage, and the output power factor command corresponding to the request for the output to the power system 12.

Figure 4:
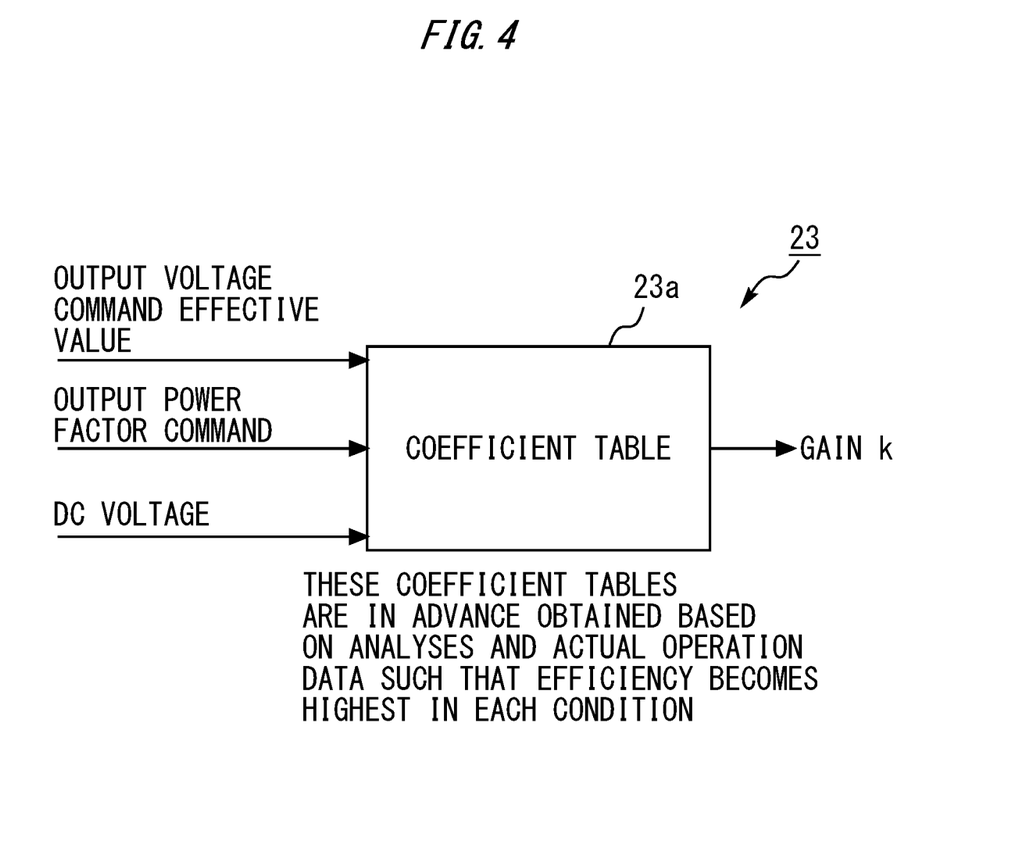
FIG. 4 is a diagram for describing a coefficient determination procedure in coefficient determination means, which is indicated by step S9 in FIG. 3.

FIG. 4 is a diagram for describing a coefficient determination procedure in the coefficient determination means 23, which is indicated by step S9 in FIG. 3.

The coefficient determination means 23 has the coefficient table 23a which defines the relationship among the effective value (amplitude) of the output voltage command, the value of the DC voltage, the output power factor command, and the coefficient which minimizes the power loss of the three-phase voltage inverter. Note that the output power factor command is obtained from an external portion such as a host device not illustrated. The contents of the coefficient table 23a are in advance obtained based on analyses and actual operation data such that the efficiency becomes highest in each condition.

Based on the correlation defined by the coefficient table 23a, the coefficient determination means 23 determines the gain k which minimizes the power loss of the three-phase voltage inverter 14 and which corresponds to the combination of the effective value, the value of the DC voltage, and the output power factor command.

Returning to FIG. 3, in step S10, the control amount calculation unit 24 of the control device 20 obtains the control amounts by multiplying the addition values obtained in step S3 by the gain k obtained in step S9.

In step S11, the output voltage command signal control unit 25 of the control device 20 respectively subtracts the control amounts obtained in step S10 from the three phases of the output voltage command signals V1 (the U-phase output voltage command signal Vu1, the V-phase output voltage command signal Vv1, and the W-phase output voltage command signal Vw1). Accordingly, the output voltage command signal control unit 25 obtains the output voltage command signals V2 (the U-phase output voltage command signal Vu2, the V-phase output voltage command signal Vv2, and the W-phase output voltage command signal Vw2).

In step S12, the PWM control unit 26 of the control device 20 compares the output voltage command signals V2 (the U-phase output voltage command signal Vu2, the V-phase output voltage command signal Vv2, and the W-phase output voltage command signal Vw2) obtained in step S11 with the triangle-wave-shaped carrier signal.

Specifically, with respect to the U phase, the PWM control unit 26 performs a comparison in magnitude between the U-phase output voltage command signal Vu2 and a carrier signal C (triangular waveform) having a predetermined carrier frequency f. Then, the PWM control unit 26 generates the gate signal such that the switching element Qu1 related to an upper arm is turned ON when the triangular waveform is smaller and the switching element Qu2 related to a lower arm is turned ON when the triangular waveform is larger. Note that the same applies to the V phase and the W phase. Accordingly, the gate signals are produced which maximizes the efficiency of the three-phase voltage inverter 14.

Functions and Effects of First Embodiment

As described above, in the first embodiment illustrated in FIG. 1 to FIG. 4, based on the coefficient table 23*a*, the coefficient determination means 23 determines the gain k which minimizes the power loss of the three-phase voltage inverter 14 and which corresponds to the combination of the effective value of the output voltage command, the value of the DC voltage, and the output power factor command (S9). Then, the control amount calculation unit 24 obtains the control amounts by multiplying, by the gain k, the addition values of the maximum phases and the minimum phases of the three phases of the output voltage command signals V1 (S10). Then, the output voltage command signal control unit 25 subtracts the control amounts from the three phases of the output voltage command signals V1 and thereby obtains the output voltage command signals V2 (S11). Then, the PWM control unit 26 generates the gate signals based on the output voltage command signals V2 and the triangle-wave-shaped carrier signal (S12).

Accordingly, in the first embodiment illustrated in FIG. 1 to FIG. 4, the gain k which maximizes the efficiency of the three-phase voltage inverter 14 can be obtained by simpler computation than a procedure in related art in which an amplitude of the third harmonic wave is superimposed. Accordingly, conversion efficiency of the three-phase voltage inverter can be improved by a simpler procedure than a procedure in related art in which an amplitude of the third harmonic wave is superimposed.

Second Embodiment

Figure 5:
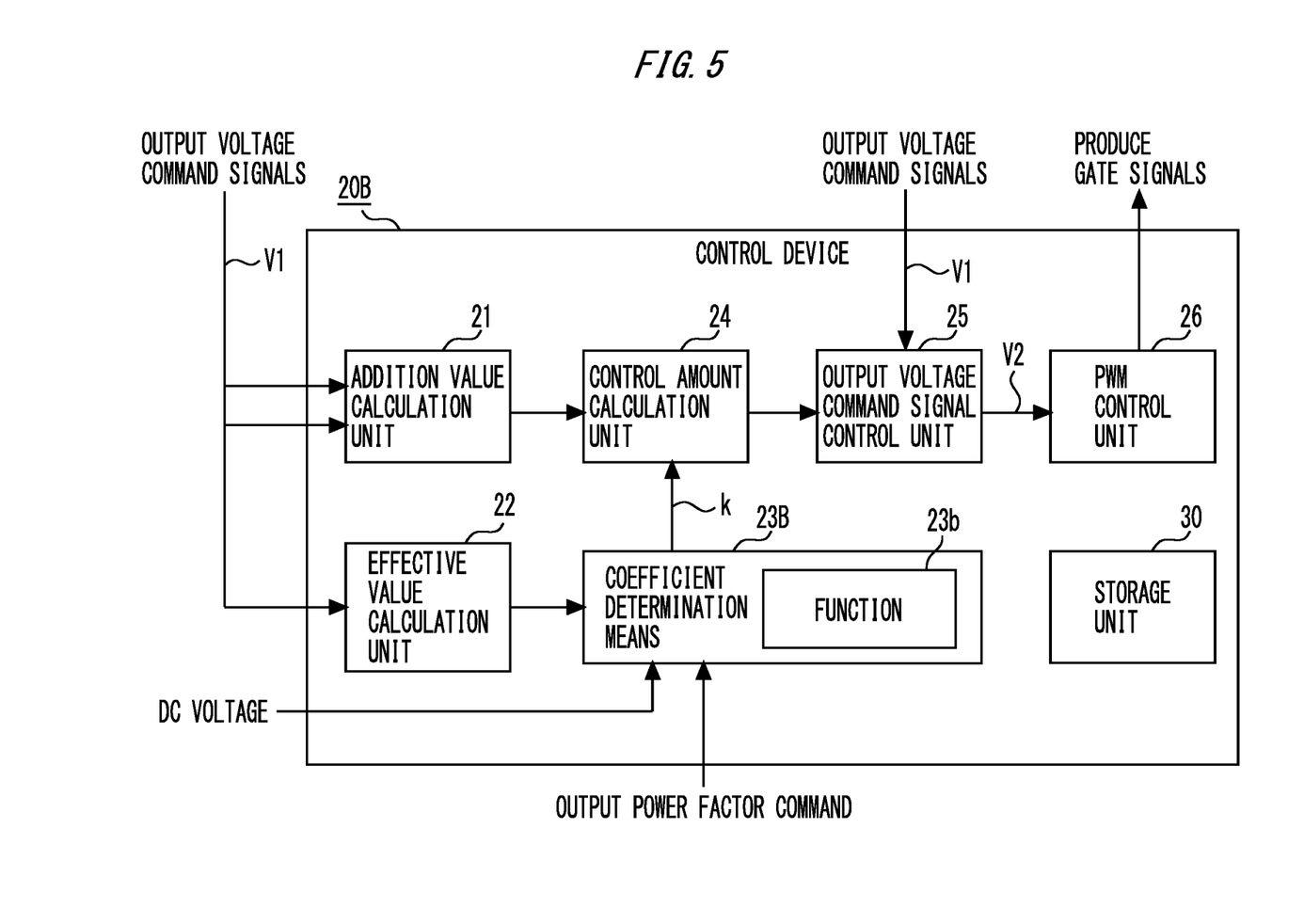
FIG. 5 is a diagram illustrating a configuration example of a control device in a power conversion device according to a second embodiment.

FIG. 5 is a diagram illustrating a configuration example of a control device 20B in a power conversion device 1B according to a second embodiment. In FIG. 5, the same reference characters are given to configurations similar to the first embodiment illustrated in FIG. 1 to FIG. 4, and detailed descriptions thereof will not be repeated or will be simplified.

In FIG. 5, the coefficient determination means 23 in the first embodiment which is illustrated in FIG. 2 is replaced by coefficient determination means 23B.

The coefficient determination means 23B determines the coefficient k (gain k) which minimizes the power loss of the three-phase voltage inverter 14 based on a function 23*b* which has, as parameters, an effective value (voltage command amplitude) x of the output voltage command, a value y of the DC voltage, and an output power factor command z. That is, in step S9 in FIG. 3, the coefficient determination means 23B determines the coefficient k (gain k) based on the function 23*b* which has, as the parameters, the effective value x obtained in step S8, the value y of the DC voltage, and the output power factor command z corresponding to the request for the output to the power system 12. The coefficient determination means 23B outputs the determined coefficient k to the control amount calculation unit 24.

Figure 6:
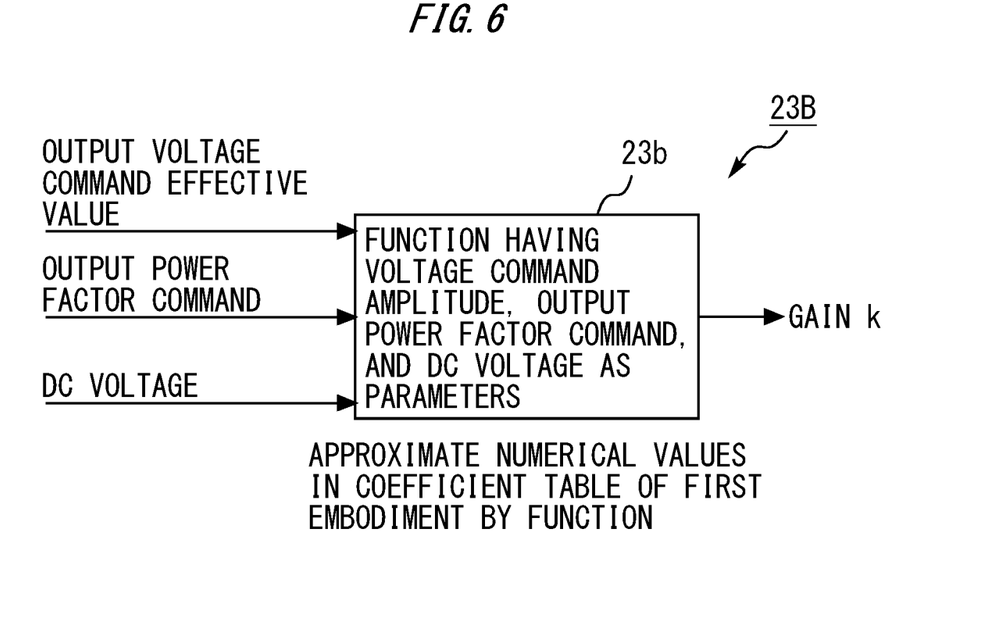
FIG. 6 is a diagram for describing a coefficient determination procedure in coefficient determination means, which is illustrated in FIG. 5.

FIG. 6 is a diagram for describing a coefficient determination procedure in the coefficient determination means 23B, which is illustrated in FIG. 5.

The coefficient determination means 23B has the function 23*b* which has, as the parameters, the effective value (voltage command amplitude) x of the output voltage command, the value y of the DC voltage, and the output power factor command z. The function 23*b* is a function which approximates numerical values of the coefficient table 23*a* in the first embodiment illustrated in FIG. 1 to FIG. 4 (approximation function). Contents of the function 23*b* are in advance obtained based on analyses and actual operation data such that the efficiency becomes highest in each condition.

Note that the function 23*b* may be retained by the coefficient determination means 23B or may be retained by the storage unit 30. Further, the function 23*b* may in advance be obtained by computation or the like or may be obtained each time by computation or the like by the coefficient determination means 23B such that the efficiency becomes highest in each condition or based on the contents of the coefficient table 23*a*.

Functions and Effects of Second Embodiment

As described above, the second embodiment illustrated in FIG. 5 and FIG. 6 provides similar effects to the first embodiment illustrated in FIG. 1 to FIG. 4.

Further, in the second embodiment illustrated in FIG. 5 and FIG. 6, the capacity of a memory can be saved more than the first embodiment illustrated in FIG. 1 to FIG. 4.

That is, the coefficient table 23*a* in the embodiment illustrated in FIG. 1 to FIG. 4 has three parameters, and because the three parameters have respective fluctuation ranges, the coefficient table 23*a* has to retain information of the coefficient k for the amount corresponding to the three parameters which respectively fluctuate. Thus, the coefficient table 23*a* in the embodiment illustrated in FIG. 1 to FIG. 4 consumes a much more capacity of the memory than a usual case.

On the other hand, in the embodiment illustrated in FIG. 5 and FIG. 6, the coefficient determination means 23B which has obtained the three parameters (x, y, z) performs computation about the three parameters (x, y, z) based on the function 23*b* and thereby determines the numerical values which approximate the numerical values of the coefficient table 23*a* illustrated in FIG. 1 to FIG. 4 by the function. Thus, because consumption of the memory can be made smaller in the embodiment illustrated in FIG. 5 and FIG. 6 than the embodiment illustrated in FIG. 1 to FIG. 4, the capacity of the memory can be saved more than the embodiment illustrated in FIG. 1 to FIG. 4.

Hardware Configuration Example

Figure 7:
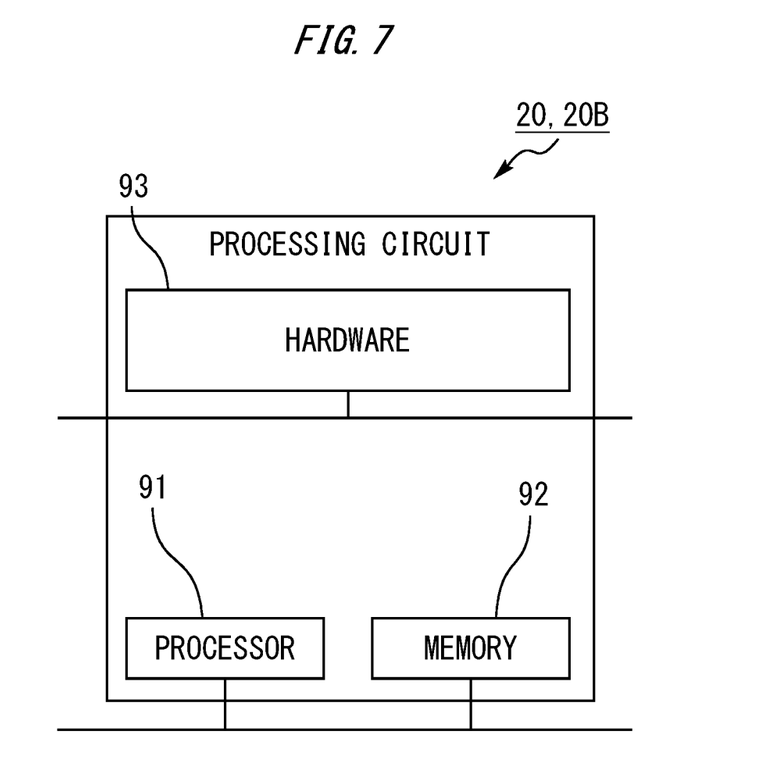
FIG. 7 is a conceptual diagram illustrating a hardware configuration example of a processing circuit provided to the control devices in the embodiments illustrated in FIG. 1 to FIG. 6.

FIG. 7 is a conceptual diagram illustrating a hardware configuration example of a processing circuit provided to the control devices 20 and 20B in the embodiments illustrated in FIG. 1 to FIG. 6. Each of the above-described functions is realized by the processing circuit. As one form, the processing circuit includes at least one processor 91 and at least one memory 92. As another form, the processing circuit includes at least one piece of dedicated hardware 93.

In a case where the processing circuit includes the processor 91 and the memory 92, each of the functions is realized by software, firmware, or a combination of software and firmware. At least one of the software and the firmware is described as a program. At least one of the software and the firmware is stored in the memory 92. The processor 91 realizes each of the functions by reading out and executing programs stored in the memory 92.

In a case where the processing circuit includes the dedicated hardware 93, the processing circuit is provided as a single circuit, a composite circuit, a processor formed as a program, or a combination of those, for example. Each of the functions is realized by the processing circuit.

A part or whole of each of the functions provided to the control devices 20 and 20B may be implemented with hardware or may be implemented as a program to be executed by the processor. That is, the control devices 20 and 20B are capable of being realized by a computer and a program, and the program is capable of being stored in a storage medium and of being provided through a network.

Supplementary Items of Embodiments

As described above, the embodiments illustrated in FIG. 1 to FIG. 7 are separated into the first embodiment illustrated in FIG. 1 to FIG. 4 and the second embodiment illustrated in FIG. 5 and FIG. 6; however, a part or whole of each of those embodiments may be combined in series or in parallel. That is, the control device 20 or 20B may have the coefficient determination means 23 and the coefficient determination means 23B as being combined in series or in parallel, and the coefficient k may be determined by combining those determination procedures in series or in parallel. The embodiments are combined, and the combined embodiments can thereby provide functions and effects to be provided by each of the embodiments which have not yet been combined.

Further, a description is made about, as an example, the two-level three-phase voltage inverter 14 having a circuit in which three legs are connected in parallel, the leg having two arms in each of which the switching element and the freewheeling diode are connected in reversely parallel and which are connected in series; however, embodiments are not limited to this. The present disclosure is applicable to a neutral-point clamped three-level inverter or a neutral-point switching three-level inverter, for example, as long as an inverter is a three-phase voltage inverter which converts a direct current to a three-phase alternating current.

Further, in the embodiments illustrated in FIG. 1 to FIG. 7, descriptions are made about aspects of the present disclosure by using, as examples, the power conversion devices 1 and 1B and the control devices 20 and 20B provided to the power conversion devices 1 and 1B; however, embodiments are not limited to those. The present disclosure is also capable of being realized as a method of controlling a three-phase voltage inverter in which processing steps in the units of the control devices 20 and 20B are performed.

Further, the present disclosure is also capable of being realized as a control program of a three-phase voltage inverter, the control program causing a computer to execute processing steps in the units of the control devices 20 and 20B.

Further, the present disclosure is also capable of being realized as a storage medium (non-transitory computer-readable medium) which stores the control program. The control program may be distributed while being stored in a removable disk or the like such as a CD (compact disc), a DVD (digital versatile disc), or a USB (universal serial bus) memory. Note that the control program may be uploaded to a network via a network interface or the like which is provided to the control device 20 or 20B and is not illustrated or may be downloaded from a network and stored in the storage unit 30 or the like.

The detailed descriptions in the foregoing will make clear the features and advantages of the embodiments. It is intended that the claims encompass the features and advantages of the above-described embodiments without departing from the spirit and scope of rights. Further, a person having ordinary skill in the art would be able to easily conceive any improvements and changes. Accordingly, it is not intended that the scope of embodiments having inventiveness be not limited to the above-described embodiments, and embodiments may be based on appropriate improvements and equivalents included in the scope disclosed in the embodiments.

REFERENCE SIGNS LIST 1, 1B power conversion device (PCS)
11 DC power source
12 power system
13 smoothing capacitor
14 three-phase voltage inverter
15 reactor
16 capacitor
17 ammeter
18 voltmeter
20, 20B control device
21 addition value calculation unit
22 effective value calculation unit
23, 23B coefficient determination means
24 control amount calculation unit
25 output voltage command signal control unit
26 PWM control unit
30 storage unit
91 processor
92 memory
93 hardware
100 power conversion device
120 control device
121 addition value calculation unit
124 control amount calculation unit
125 output voltage command signal control unit
126 PWM control unit
C carrier signal
Du1, Du2, Dv1, Dv2, Dw1, Dw2 freewheeling diode
f carrier frequency
k coefficient (gain)
P power command
Qu1, Qu2, Qv1, Qv2, Qw1, Qw2 switching element
V1 output voltage command signal (first output voltage command signal)
V2 output voltage command signal (second output voltage command signal)
Vd d-axis voltage command signal
VH voltage across terminals
Vq q-axis voltage command signal
Vu1 U-phase output voltage command signal
Vv1 V-phase output voltage command signal
Vw1 W-phase output voltage command signal
Vu2 U-phase output voltage command signal
Vv2 V-phase output voltage command signal
Vw2 W-phase output voltage command signal
x effective value (amplitude, voltage command amplitude) of output voltage command
y value of DC voltage
z output power factor command

The invention claimed is:

1. A power conversion device comprising:
a three-phase voltage inverter which converts a DC voltage from a DC power source to three-phase AC voltages and outputs the three-phase AC voltages to a power system;
an addition value calculation circuit which obtains addition values of maximum phases and minimum phases of first output voltage command signals as three phases of sinusoidal output voltage command signals in the three-phase AC voltages;
an effective value calculation circuit which obtains an effective value of an output voltage command based on the three phases of the first output voltage command signals;
coefficient determination means for determining a coefficient which minimizes power loss of the three-phase voltage inverter based on the effective value obtained by the effective value calculation circuit, a value of the DC voltage, and an output power factor command corresponding to a request for an output to the power system;
a control amount calculation circuit which obtains control amounts by multiplying the addition values obtained by the addition value calculation circuit by the coefficient determined by the coefficient determination means;
an output voltage command signal control circuit which obtains second output voltage command signals as signals resulting from subtraction of the control amounts obtained by the control amount calculation circuit respectively from the three phases of the first output voltage command signals; and
a PWM control circuit which generates gate signals based on the second output voltage command signals obtained by the output voltage command signal control circuit and a triangle-wave-shaped carrier signal.

2. The power conversion device according to claim 1, wherein
the effective value calculation circuit obtains the effective value by converting the three phases of the first output voltage command signals to a d-axis voltage command signal and a q-axis voltage command signal and by taking a square root of a sum of a square of the d-axis voltage command signal resulting from conversion and a square of the q-axis voltage command signal resulting from the conversion.

3. The power conversion device according to claim 2, wherein the coefficient determination means determines the coefficient corresponding to a combination of the effective value, the value of the DC voltage, and the output power factor command based on a coefficient table which defines a relationship among the effective value, the value of the DC voltage, the output power factor command, and the coefficient which minimizes the power loss of the three-phase voltage inverter.

4. The power conversion device according to claim 2, wherein the coefficient determination means determines the coefficient which minimizes the power loss of the three-phase voltage inverter based on a function which has, as parameters, the effective value, the value of the DC voltage, and the output power factor command.

5. The power conversion device according to claim 1, wherein
the coefficient determination means determines the coefficient corresponding to a combination of the effective value, the value of the DC voltage, and the output power factor command based on a coefficient table which defines a relationship among the effective value, the value of the DC voltage, the output power factor command, and the coefficient which minimizes the power loss of the three-phase voltage inverter.

6. The power conversion device according to claim 1, wherein
the coefficient determination means determines the coefficient which minimizes the power loss of the three-phase voltage inverter based on a function which has, as parameters, the effective value, the value of the DC voltage, and the output power factor command.

7. A method of controlling a three-phase voltage inverter in a power conversion device which includes the three-phase voltage inverter converting a DC voltage from a DC power source to three-phase AC voltages and outputting the three-phase AC voltages to a power system, the method comprising:
calculating addition values of maximum phases and minimum phases of first output voltage command signals as three phases of sinusoidal output voltage command signals in the three-phase AC voltages;
calculating an effective value of an output voltage command based on the three phases of the first output voltage command signals;
determining a coefficient which minimizes power loss of the three-phase voltage inverter based on the calculated effective value, a value of the DC voltage, and an output power factor command corresponding to a request for an output to the power system;
calculating control amounts by multiplying the calculated addition values by the determined coefficient;
determining second output voltage command signals as signals resulting from subtraction of the calculated control amounts respectively calculated from the three phases of the first output voltage command signals; and
generating gate signals based on the determined second output voltage command signals and a triangle-wave-shaped carrier signal.

8. A non-transitory computer-readable storage medium storing a control program of a three-phase voltage inverter, the control program causing a computer to execute controlling a three-phase voltage inverter according to claim 7.

9. A power conversion device comprising:
a three-phase voltage inverter which converts a DC voltage from a DC power source to three-phase AC voltages and outputs the three-phase AC voltages to a power system;
an addition value calculation circuit configured to calculate addition values of maximum phases and minimum phases of first output voltage command signals as three phases of sinusoidal output voltage command signals in the three-phase AC voltages;
an effective value calculation circuit configured to calculate an effective value of an output voltage command based on the three phases of the first output voltage command signals;
coefficient determination circuitry configured to determine a coefficient which minimizes power loss of the three-phase voltage inverter based on the effective value obtained by the effective value calculation circuit, a value of the DC voltage, and an output power factor command corresponding to a request for an output to the power system;
a control amount calculation circuit configured to calculate control amounts by multiplying the addition values obtained by the addition value calculation circuit by the coefficient determined by the coefficient determination circuitry;

an output voltage command signal control circuit configured to determine second output voltage command signals as signals resulting from subtraction of the control amounts obtained by the control amount calculation circuit respectively from the three phases of the first output voltage command signals; and a PWM control circuit configured to generate gate signals based on the second output voltage command signals obtained by the output voltage command signal control circuit and a triangle-wave-shaped carrier signal.

10. The power conversion device according to claim 9, wherein the effective value calculation circuit is further configured to calculate the effective value by converting the three phases of the first output voltage command signals to a d-axis voltage command signal and a q-axis voltage command signal and by taking a square root of a sum of a square of the d-axis voltage command signal resulting from conversion and a square of the q-axis voltage command signal resulting from the conversion.

11. The power conversion device according to claim 10, wherein the coefficient determination circuitry is further configured to determine the coefficient corresponding to a combination of the effective value, the value of the DC voltage, and the output power factor command based on a coefficient table which defines a relationship among the effective value, the value of the DC voltage, the output power factor command, and the coefficient which minimizes the power loss of the three-phase voltage inverter.

12. The power conversion device according to claim 10, wherein the coefficient determination circuitry is further configured to determine the coefficient which minimizes the power loss of the three-phase voltage inverter based on a function which has, as parameters, the effective value, the value of the DC voltage, and the output power factor command.

13. The power conversion device according to claim 9, wherein the coefficient determination circuitry is further configured to determine the coefficient corresponding to a combination of the effective value, the value of the DC voltage, and the output power factor command based on a coefficient table which defines a relationship among the effective value, the value of the DC voltage, the output power factor command, and the coefficient which minimizes the power loss of the three-phase voltage inverter.

14. The power conversion device according to claim 9, wherein the coefficient determination circuitry is further configured to determine the coefficient which minimizes the power loss of the three-phase voltage inverter based on a function which has, as parameters, the effective value, the value of the DC voltage, and the output power factor command.

\* \* \* \* \*